J. Mackay,
Rx 8
Piano Action,
No. 8.
Reissued Apr. 23, 1839.
5189X Related Doc
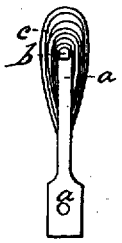

Rx 8

UNITED STATES PATENT OFFICE.

JOHN MACKAY, OF BOSTON, MASSACHUSETTS.

IMPROVEMENT IN THE MODE OF FITTING THE HAMMER-HEADS OF PIANO-FORTES.

5189X

Specification forming part of Letters Patent dated August 14, 1828; Reissue No. 8, dated April 23, 1839.

*To all whom it may concern:*

Be it known that I, JOHN MACKAY, of the city of Boston, in the State of Massachusetts, have invented an Improvement in the Mode of Fitting or Making the Hammer-Heads of Piano-Fortes; and I do hereby declare that the following is a full and exact description thereof.

Into the top of the wooden portion of the hammer-head I insert, in an opening or groove prepared for that purpose, a piece of lead or other metallic substance, after which I put on the usual covering of leather or other elastic substance.

In the accompanying drawing, *a a* represent the wooden part of the hammer-head, and *b* the piece of metal let into it immediately under the elastic covering *c*. The effect of so weighting or loading the hammer-head is to cause it to produce by its blow upon the strings a much stronger, fuller, and louder tone than that produced by the common mode of making hammers.

I am aware that the keys of hammers have been frequently loaded by the insertion of plugs or pieces of metal for the purpose of accelerating their fall in playing; but the object and effect of my invention is altogether different, it being to effect the force and quality of the tone.

What I claim as my invention, and desire to secure by Letters Patent, is—

The insertion of a piece of metal or the affixing the same in any equivalent manner to the upper end of the hammer-head, substantially in the manner and for the purpose above set forth.

JOHN MACKAY.

Witnesses:
THOS. P. JONES,
LINTON THORN.